United States Patent [19]

Den Blaker

[11] 4,133,432

[45] Jan. 9, 1979

[54] GOBLET-TYPE RECEPTACLE HOLDER

[76] Inventor: William E. Den Blaker, 23930 Ocean Ave., Torrance, Calif. 90505

[21] Appl. No.: 729,851

[22] Filed: Oct. 4, 1976

[51] Int. Cl.² ............................................. A47G 29/00
[52] U.S. Cl. ..................................... 211/71; 211/181; 248/302
[58] Field of Search .................... 211/71-75, 211/181, 182, 184, 153, 60, 94; 248/302, 303, 309-312

[56] References Cited

U.S. PATENT DOCUMENTS

| | | | |
|---|---|---|---|
| 2,230,975 | 2/1941 | Gratz | 211/60 R X |
| 3,154,196 | 10/1964 | Loska, Jr. et al. | 248/302 X |
| 3,214,031 | 10/1965 | McCauley | 211/181 X |
| 3,669,278 | 6/1972 | Heroy | 211/184 |

Primary Examiner—Roy D. Frazier
Assistant Examiner—Terrell P. Lewis

Attorney, Agent, or Firm—Leonard Zalman

[57] ABSTRACT

A goblet-type receptacle holder characterized by a plurality of receptacle receiving channels on each side of a central inlet channel with which the receiving channels communicate. The receiving channels can be defined by the parallel disposed legs of substantially W-shaped members. A first pair of substantially U-shaped members connected to the W-shaped members at the ends thereof remote from the inlet channel provide support for the holder via fasteners passed therebetween and a second pair of substantially U-shaped members provide additional support for the first pair of U-shaped members. The second pair of U-shaped members also provide for interconnecting and rigidizing the holder components. The character-shaped members and other support and linkage rods can be metallic rods or strips and can be of a material susceptible to resistance welding.

1 Claim, 4 Drawing Figures

GOBLET-TYPE RECEPTACLE HOLDER

BACKGROUND OF THE INVENTION

In recent years there has developed an increasing usage of goblet-type receptacles, such as, for example, brandy sniffers, cordial glasses and wine glasses. Due to the nature of goblet-type receptacles, that is, their often long and relatively thin stem and broad base, goblet-type receptacles are often very fragile and very prone to breakage if not stored properly. Furthermore, goblet-type receptacles are often made of fine leaded glass and cut crystal which makes them expensive and enhances the need for proper storage.

At present, there has not been available on the market a goblet-type receptacle holder for home usage. Goblet-type receptacle holders utilized in commercial spirits dispensing establishments are generally made of laminated wood (plywood) or other wood strips which are permanently mounted and often bulky and space consuming. Obviously, the commercial type of goblet-type receptacle holder is not suitable for home usage where easy mounting and relocation of the holder, space utilization, and low cost are primary considerations.

OBJECTS OF THE INVENTION

It is therefore an object of the present invention to provide a holder for goblet-type receptacles.

It is a further object of the present invention to provide a holder for goblet-type receptacles that is designed for household use.

It is a further object of the present invention to provide a holder for goblet-type receptacles that is easy to install by the homeowner or tenant.

It is a further object of the present invention to provide a holder for goblet-type receptacles that is relatively inexpensive.

It is a further object of the present invention to provide a holder for goblet-type receptacles that will accommodate a variety of such receptacles of varying sizes.

It is a still further object of the present invention to provide a holder for goblet-type receptacles that can store a large quantity of such receptacles in a relatively small space.

SUMMARY OF THE INVENTION

In accordance with the invention, there is provided a goblet-type receptacle holder characterized by a metal frame comprised of a first plurality of metallic members disposed in a first plane and a second plurality of metallic members substantially disposed in a second plane parallel to the first plane, which interconnecting metallic members disposed between the members of the first and second planes to provide a rigid framework. In the orientation for usage, the second plane is above the first plane. Some of the metallic members of the first plurality of such members are orientated in a first direction and other of the metallic members of the first plurality of such members are orientated in a direction substantially orthogonal to the first direction. Pairs of members orientated in the first direction support the goblet-type receptacles by supporting the base thereof and these members have a spacing therebetween which is sufficiently wide to receive the stem of even the largest goblet-type receptacle but sufficiently close that the base of the smallest goblet-type receptacle cannot fall therethrough. There can be just one pair of goblet-type receptacle supporting members or two or more pairs of such members for additional storage capacity. In a preferred embodiment, the holder has storage capacity on both sides of an entry way provided by some of the members orientated in a second direction. In this embodiment, the member orientated in the first direction that is furthest from the entry way is continuous on both sides of the entry wall whereas all other members in that orientation extend only on one side or the other of the entry way to provide for the formation of the entry way.

The members in the second plane also extend in orthogonal directions. One pair of these members is disposed centrally of the second plane and in the first direction. This pair of members has a separation therebetween which is sufficient for the body of a screw or other anchoring device to extend therethrough but which is close enough so that a washer encircling the screw or the screwhead will not fit therethrough.

The metallic members of the holder can be copper, copper plated steel, or metallic alloy rods of about ⅛ inch diameter. In lieu of rods, metallic strips can be used. The holder can be made by cutting rods or strips to size, clamping the rods or strips in a jig or other holding device and then spot welding the members at intersection or crossover points. In lieu of spot welding, the rods or strips can be made of a low electrical resistance material and united by sending a control current therethrough to provide resistance welds at intersection or crossover points.

DETAIL DESCRIPTION OF THE INVENTION

Figure 1:
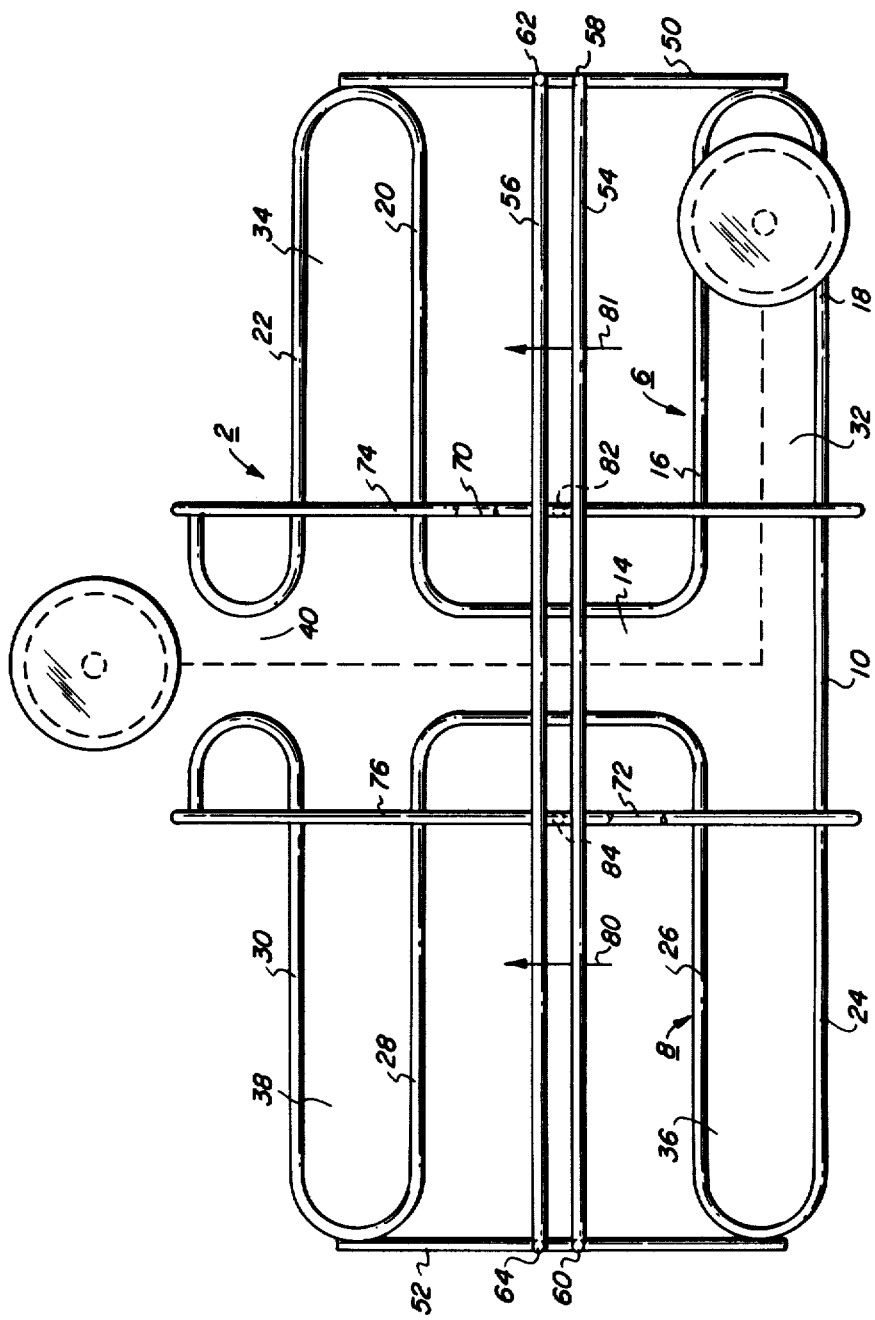
FIG. 1 is a perspective view of a goblet-type receptacle holder in accordance with one embodiment of the invention.
Figure 2:
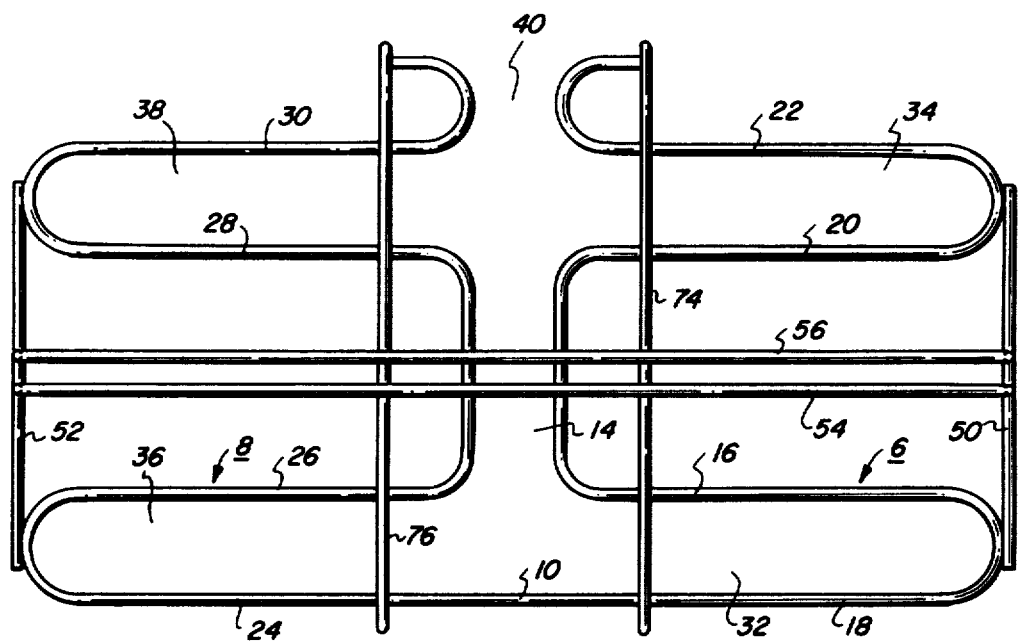
FIG. 2 is a top view of the holder of FIG. 1.
Figure 3:
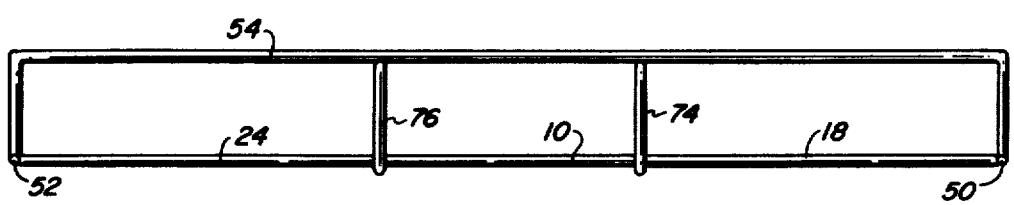
FIG. 3 is a side view of the holder of FIG. 1.
Figure 4:
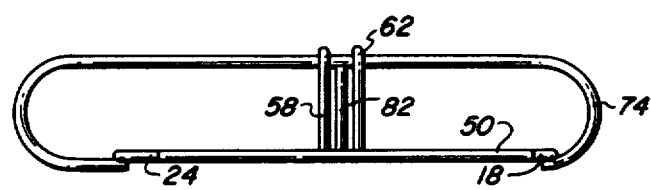
FIG. 4 is an end view of the holder of FIG. 1.

Referring at this time to the drawings, there is disclosed a goblet-type receptacle holder or rack 2 in accordance with a preferred embodiment of the invention. The rack 2 includes a substantially planar lower portion comprised of a continuous metallic rod which is bent to the shape of substantially back-to-back "W" components 6 and 8 connected in the area 10. The W-shaped components 6 and 8 have parallel legs. The space between the unconnected portions of W-shaped components 6 and 8 define a receptacle receiving channel 14. In a similar manner the legs 16 and 18 of W-shaped component 6, the legs 20 and 22 of W-shaped component 6, the legs 24 and 26 of W-shaped component 8, and the legs 28 and 30 of W-shaped component 8 define receptacle receiving channels 32, 34, 36 and 38, respectively. Each of the channels 32, 34, 36 and 38 is closed at the end thereof remote from the channel 14. As shown, the channels 32, 34, 36 and 38 communicate with channel 14 and the respective entry port 40. Channels 32, 34, 36 and 38 have a width that both will permit the stem of a very large goblet-type receptacle to fit therebetween but will not permit the support base of a very small receptacle to slip therethrough. As an example, the width of the channels 14, 32, 34, 36 and 38 can be about 1 inch, however, both wider or narrower channels can be used within the range of fractions of an inch or several inches. Some channels can be wider than other channels.

The closed ends of the channels 32 and 34 are joined together by a rod 50 and the closed ends of the channels 36 and 38 are joined together by a rod 52. The rods 50 and 52 serve the dual function of rigidizing the W-shaped component structure and supporting "inverted U-shaped" members 54 and 56 via the short legs 58, 60, 62 and 64 of members 54 and 56. Further rigidity of the W-shaped component structure is provided by rods 70 and 72. Additional support for members 54 and 56 and further rack rigidity is provided by substantially U-shaped members 74 and 76 disposed on each side of the channel 14. The members 54 and 56 are atop members 74 and 76 and welded thereto. Further support for the members 54 and 56 is provided by vertically disposed rod 82 which is welded to rod 70 and member 74 and vertically disposed rod 84 which is welded to rod 72 and member 76.

The length of legs 58, 60, 62 and 64 of U-shaped members 54 and 56 and the height of rods 82 and 84 are chosen so that the top rods of members 54 and 56 are displaced from the channels 14, 32, 34, 36 and 38 by a distance which will permit the base of a goblet-type receptacle to be passed therebetween and positioned on the leg boundaries of channels 32, 34, 36 and 38 for support. A distance of about 1¼" is satisfactory for this displacement, although larger and smaller displacements are contemplated in accordance with the invention. The distance between inverted U-shaped members 54 and 56 is chosen to allow the body of a screw or other fastener or anchoring device to pass therebetween. However, the head of the screw or other fastener or anchor should not be permitted to pass between members 54 and 56. This will allow a screw or other fastener or anchor to support the holder or rack 2. A larger spacing between the members 54 and 56 is possible if the screw or other fastener or anchor is provided with a washer or is provided with a larger than normal head. A distance of about ¼" between members 54 and 56 is satisfactory, although distances of smaller or larger fractions of an inch or of an inch or more are contemplated.

As noted, the various letter-shaped members and rods are welded together. These welds can be produced by a conventional spot welding process. Alternatively, the various members and rods can be made of materials which can be resistance welded such as copper plated steel. In the resistance welding process, the members are clamped together in a jig device and connected to an electrical power source. Current passing through the junction or crossover points of the various rods and members produce sufficient heat to weld the rods and-/or members together.

To install the holder or rack 2 for usage, the rack is held in the orientation of FIG. 1, that is, with rods 54 and 56 above the receptacle receiving channels 32, 34, 36 and 38. Screws, depicted by arrows 80 and 81 in FIG. 1, are inserted between rods 54 and 56, one on each side of the channel 14 and screwed into a wood or metal anchoring surface in contact with rods 54 and 56. The heads of the screws, or washers carried by the bodies of the screws contact the rods 54 and 56 and hold the rack 2 firmly in place. Although two screws are depicted, a greater number can be used depending upon the weight of the receptacles held by the rack and the weight and length of the rack itself.

As shown in FIG. 1, a goblet-type receptacle 90 is stored on the rack 2 by inserting the goblet-type receptacle, in its inverted position, through entry port 40 into channel 14 and guiding it along a path (depicted by the dashed line) to one of the channels 32, 34, 36 and 38, in this case channel 32, to the resting place desired for that goblet. Other goblet-type receptacles (not shown) can be similarly positioned in channel 32 and in channels 34, 36 and 38.

As described, the rack or holder 2 has four receptacle holding channels, two disposed on each side of the entry port 40 and inlet central channel 14. That rack configuration has a large storage capacity. Smaller storage capacities can be achieved by utilizing only one receptacle holding channel on each side of entry port 40 or by providing one or more receptacle holder channels on only one side of entry port 40 and channel 14. Obviously, in the latter configuration the support rods 54 and 56 would extend only on one side of the entry port 40.

The rack or holder of the invention could be formed by a conventional injection molding process wherein a mold is provided which defines the configuration for the holder. An aperture in the mold provides an entry through which the molten material, for example, a molten metal or plastic, is injected into the mold. Upon cooling of the molten material, it is separated from the mold. Of course, all injection moldable plastics could serve the requirements of the invention. A particularly suitable plastic material would be polysulfone which is a rigid, strong thermoplastic that can be molded into a wide variety of shapes.

Although the invention has been described in relation to a preferred embodiment thereof, modifications will be apparent to those versed in the art. Accordingly, the scope of the invention is defined only in accordance with the claims.

I claim:
1. A rack for supporting wide-based, stemmed receptacles in a pendant position comprising:
   at least two pairs of receptacle-supporting channels of a fixed extent, each of said receptacle-supporting channels being defined by a pair of elongated rigid members having a substantially uniform spacing therebetween, said pairs of rigid members being positioned in a common plane and extending in a common direction in said common plane,
   a pair of elongated, rigid rack-supporting members, each of said pair of rack-supporting members being comprised of a substantially straight major portion lying in a plane parallel to said common plane and a pair of minor portions extending in a plane substantially perpendicular to said common plane, said minor portions of said rack-supporting members being rigidly coupled to said receptacle-supporting channels at opposite ends thereof, said major portions of said rack-supporting members extending in said common direction, said major portions of said rack-supporting members having a substantially uniform spacing therebetween which spacing is less that said spacing between said pairs of elongated rigid members defining said receptacle-supporting channels, said major portions of said rack-supporting members having an extent at least equal to a major portion of said fixed extent of said receptacle-supporting channels.

* * * * *